ALLYL ALCOHOL PRODUCTION
Robert W. Fourie, South Norwalk, Conn., and Russel L. Maycock, Houston, and Gregor H. Riesser, Pasadena, Tex., assignors to Shell Oil Company, New York, N.Y., a corporation of Delaware
No Drawing. Filed May 24, 1961, Ser. No. 112,233
2 Claims. (Cl. 260—632)

This invention relates to the preparation of allyl alcohol from propylene oxide. More particularly, it relates to an improved catalytic method for the rearrangement of propylene oxide to allyl alcohol.

At elevated temperatures and particularly in the presence of certain catalysts, propylene oxide is known to undergo rearrangement to a variety of stabler configurations. For example, the use of such catalysts as alumina, aluminum sulfate, potassium chromate and chromic oxide-tungstic oxide for the high-temperature conversion of propylene oxide to propionaldehyde is described in U.S. 2,601,538, issued June 24, 1952, to Lunsted. When alumina is employed, some of the propylene oxide is also converted to allyl alcohol, according to U.S. 1,917,179, issued July 4, 1933, to Young et al., so that a mixture of 60% propionaldehyde and 30% allyl alcohol is obtained. The use of lithium phosphate to catalyze the rearrangement of propylene oxide to a mixture containing principally allyl alcohol has also been reported.

It is an object of the present invention to provide a novel catalytic process for the conversion of propylene oxide to allyl alcohol in high yield. Another object of the invention is the provision of a new catalyst for the catalytic rearrangement of propylene oxide to allyl alcohol. A further object is the provision of a vapor-phase trilithium arsenate-catalyzed process for the selective conversion of propylene oxide to allyl alcohol. Other objects will be apparent from the following detailed description of the invention.

The objects are accomplished in the following invention by the process which comprises contacting propylene oxide with trilithium arsenate at a temperature of at least about 200° C., and separating the resulting allyl alcohol from the propylene oxide.

The process is preferably conducted in the vapor phase, and while it may be performed at pressures below or above atmospheric, it is most conveniently conducted at atmospheric pressure. Thus, the propylene oxide is vaporized by heating to a temperature above about 35° C., and the resulting vapor passed to a reaction zone wherein it is brought into intimate contact with the catalyst. The conversion has been found to be more efficient if the propylene oxide vapor is preheated to a temperature corresponding to about that at which the catalyst is maintained, between about 200° C. and about 350° C. Such preheating is readily achieved by conventional methods, i.e., by heat exchangers employing steam, Dowtherm or similar fluids, or counterflowing effluent vapor as a heat source. Sufficient pressure must, of course, be applied to the vapor stream to move it through the reaction system and to overcome the resistance of the tubes and catalyst mass. This pressure, while small, will be governed by the nature of the specific reaction system.

The propylene oxide vapor, at a suitable temperature, is brought into contact with a solid wherein trilithium arsenate, $Li_3AsO_4$, is the active catalytic component, at a temperature of above about 200° C.

It has been found that lithium salts in general are not selective catalysts for the conversion of propylene oxide to allyl alcohol. Indeed, most lithium salts are catalytically inactive or only marginally active. It is therefore surprising that trilithium arsenate should be effective in the process at all. However, not only does trilithium arsenate selectively convert propylene oxide to allyl alcohol in high yield, but it also produces a minimum of other rearrangement or degradation products.

The catalyst itself may be in the form of particles, spheres, pellets, rods, or other convenient shapes. The solid may be composed entirely of the trilithium arsenate or, alternatively, the trilithium arsenate may be precipitated on an inert supporting material such as pumice, fuller's earth, diatomaceous earth, celite or the like. Any refractory material which itself does not catalyze the isomerization of propylene oxide under the reaction conditions is a suitable support.

In the process of the invention, the trilithium arsenate is contacted with the propylene oxide vapor at a temperature above about 200° C. Since the reactant and the desired product tend to decompose at temperatures above about 450° C., best yields are obtained when practicing the process below that temperature. A temperature range of about 250° C. to about 350° C. is, however, preferred. The catalyst and catalyst contact zone are heated in conventional methods, but since the rearrangement reaction is exothermic, means of controlling the temperature are desirable. For example, the catalyst may be disposed in packed beds or tubes of high surface-to-volume ratio, and the heat transfer gas or fluid temperature controlled so as to minimize over-heating or the development of hot spots.

The rate of feed of propylene oxide to the catalyst zone is not critical. In general, however, it should be regulated so as to maintain the temperature of the catalyst zone at the desired level. From about 1 to about 3 volumes of propylene oxide per volume of catalyst per hour at temperatures of 250–300° C. have been found to give excellent results. Greater or lower flow rates may be employed depending on the shape of the catalyst mass, the surface area presented and the reaction temperature. If desired, inert diluents, such as nitrogen, steam, helium, toluene, carbon dioxide or similar non-reactive gases may also be passed through the system to aid in temperature control.

Upon emerging from the catalyst zone, the propylene oxide stream contains the allyl alcohol rearrangement product, together with minor amounts of such other products as acetone, propanol and propanol and propionaldehyde. An important feature of the present invention, however, is that the amount of these impurities in the product is surprisingly small. The allyl alcohol is readily separated from unconverted propylene oxide, the latter being most conveniently recycled. Recovery of the allyl alcohol may be accomplished by condensing the effluent stream from the catalyst zone, by washing it, or by distillation or similar known methods. Water may be added to separate the allyl alcohol as a constant boiling mixture of alcohol and water, the water subsequently being removed by drying.

After exposure of the trilithium arsenate to propylene oxide under the reaction conditions described for extended times, it has been observed that the catalytic activity of the material declines somewhat. The trilithium arsenate can, however, be readily restored to its initial activity by treatment with suitable solvents when the activity of the trilithium arsenate has declined to uneconomical levels. In general, it is desirable to treat the catalyst in this manner when the conversion of propylene oxide has declined more than about 10%. For example, the catalyst is readily reactivated by washing or back-washing it with an oxygen-containing solvent. Typical solvents include ethylene oxide, propylene oxide, butylene oxide and similar alkylene oxides, particularly those of up to 6 carbon atoms; alcohols having up to about 6 carbon atoms such as allyl alcohol, methanol, ethanol, pentanol and the like; ketones having up to 8 carbon atoms, such as dimethyl ketone, cyclohexanone, methyl ethyl ketone, ethyl amyl ketone and methyl isobutyl ketone; ethers, having up to 8 carbon atoms, such as diethyl ether, dipropyl ether, ethyl amyl ether, and dioxane. Other useful oxygen-containing polar solvents are carboxylic acids having up to 6 carbon atoms, such as acetic acid, propionic acid, pentanoic acid and hexanoic acid and esters thereof, particularly those of the alcohols noted, and aldehydes having up to 6 carbon atoms, such as formaldehyde, acetaldehyde, propionaldehyde, butyraldehyde and caproaldehyde. Aromatic hydrocarbons having up to 10 carbon atoms such as benzene, toluene, the xylenes, ethyl benzene, and the like, are also effective solvents for the regeneration of the catalyst. Although high temperature steam reduces the effectiveness of the catalyst, liquid water is also an effective regeneration solvent.

The regeneration may be conducted at any convenient temperature within the range wherein the solvent is liquid at the operating temperature and pressure. A suitable range for the regeneration of the catalyst is that from about 25° C. to about 100° C. Preferred liquids for the regeneration process are propylene oxide and allyl alcohol since in addition to being effective solvents these materials may readily be purified in the purification sections ancillary to the process of the invention and recycled or recovered.

To illustrate further the novel and improved features of the invention, the following examples are presented. It should be understood, however, that the examples are merely illustrative and are not to be regarded as limitations to the appended claims since the basic teachings thereof may be varied at will, as will be understood by one skilled in the art. In the examples, the proportions are expressed in parts by weight unless otherwise noted.

EXAMPLE I

Powdered trilithium arsenate was compressed to form pellets about 5 mm. long by 6.2 mm. diameter. The pellets were charged to a jacketed glass reactor heated with Dowtherm (the eutectic mixture of diphenyl and diphenyl oxide), 46.3 grams of catalyst having a volume of about 50 ml. being employed. The temperature of the reactor was brought to 246.5° C.

Propylene oxide vapor was preheated to about 245° C. and fed to the reactor at a rate of 94.5 ml./hour. The effluent from the reactor was condensed and analyzed by gas-liquid chromatography. The following product distribution was found:

Percent weight
Propylene oxide _____ 93.0
Allyl alcohol _____ 6.6
Acetone _____ 0.1
Propionaldehyde _____ 0.3

It will be seen from these data that propylene oxide conversion was 7% and selectivity to allyl alcohol was 94%.

EXAMPLE II

Pelletized trilithium arsenate (41.3 g.) was charged to a jacketed stainless steel reactor heated with Dowtherm, and the reactor was heated to 303° C. Propylene oxide vapor preheated to 260° C. was fed to the reactor at a rate of 62 ml./hour, and the reactor effluent was condensed and analyzed as in the previous experiment.

Propylene oxide conversion was found to be 30% and the selectivities were as follows:

Percent
Allyl alcohol _____ 85.1
n-Propyl alcohol _____ 0.7
Acetone _____ 1.8
n-Propionaldehyde _____ 6.6
Heavy ends _____ 5.8

EXAMPLE III

Using the techniques of the previous examples, a series of experiments was conducted to determine the catalytic activity of a series of materials. In each run, the catalyst was maintained at a temperature between 200–300° C. The product distribution resulting from such runs is tabulated below. The data were obtained by gas-liquid chromatographic analysis of the effluent, the remainder of the effluent being unreacted propylene oxide and heavy ends.

*Rearrangement of propylene oxide over various catalysts (at 200–300° C.) product distribution*

| Catalyst | Allyl Alcohol, percent | Acetone, percent | Isopropyl Alcohol, percent | n-Propyl Alcohol, percent | Ethyl Alcohol, percent | Propionaldehyde, percent | Unknown Components No. | Unknown Components Total percent |
|---|---|---|---|---|---|---|---|---|
| Lithium arsenate | 25.55 | 0.55 | | 0.22 | | 1.97 | | 1.72 |
| Lithium nitrate | 0.3 | 1.0 | 0.7 | | | 25.0 | 3 | 0.5 |
| Lithium chloride | | 0.3 | | | | 0.6 | | |
| Lithium fluoride | | trace | | | | trace | | |
| Lithium phosphate (comm'l) | | trace | | | | trace | | |
| Lithium silicofluoride | 0.05 | 0.05 | | 0.1 | | 0.8 | | |
| Lithium molybdate | | | | | | | | |
| Lithium tartrate | | trace | | | | 0.05 | | |
| Lithium m-vanadate | | trace | | | | 0.2 | 1 | 0.05 |
| Lithium bichromate | | | | | | 8.5 | 1 | 0.1 |
| Lithium m-phosphate | 0.1 | 0.3 | | 0.15 | | trace | | |
| Lithium zirconate | | | | | | 0.5 | 2 | 0.1 |
| Lithium m-silicate | | 0.5 | | | | trace | | |
| Lithium dichromate | | trace | | | | 0.1 | 1 | 0.05 |
| Lithium chlorate | | | | 0.05 | | 3.0 | | |
| Lithium phosphomolybdate | 2.0 | 1.0 | 0.05 | 3.0 | | 3.0 | | |

We claim as our invention:

1. The process for the preparation of allyl alcohol, which comprises contacting propylene oxide in the vapor phase with trilithium arsenate at a temperature between about 200° C. and about 350° C., and separating the resulting allyl alcohol from the propylene oxide.

2. The process for the preparation of allyl alcohol, which comprises heating propylene oxide to a temperature between about 200° C. and about 350° C., and contacting said heated propylene oxide in the vapor phase with trilithium arsenate, said trilithium arsenate being at a temperature between about 200° C. and 350° C., and separating the resulting allyl alcohol from the propylene oxide.

References Cited by the Examiner
UNITED STATES PATENTS 2,426,264  8/47  Fowler et al. _____ 260—632
3,090,815  5/63  Denton _____ 252—414
3,090,816  5/63  Denton _____ 252—414
3,092,668  6/63  Bruson et al. _____ 252—414

OTHER REFERENCES

Caven et al., "Systematic Inorganic Chemistry," Blackie and Son Limited (1946), London and Glasgow, pages 335 and 336.

LEON ZITVER, *Primary Examiner*.

LORRAINE A. WEINBERGER, *Examiner*.